(12) United States Patent
Roberts et al.

(10) Patent No.: US 8,547,843 B2
(45) Date of Patent: Oct. 1, 2013

(54) SYSTEM, METHOD, AND COMPUTER PROGRAM PRODUCT FOR CONTROLLING OUTPUT PORT UTILIZATION

(75) Inventors: Lawrence G. Roberts, Woodside, CA (US); Alex E. Henderson, Portola Valley, CA (US)

(73) Assignee: Saisei Networks Pte Ltd, Singapore (SG)

( * ) Notice: Subject to any disclaimer, the term of this patent is extended or adjusted under 35 U.S.C. 154(b) by 1014 days.

(21) Appl. No.: 11/335,973

(22) Filed: Jan. 20, 2006

(65) Prior Publication Data

US 2007/0171826 A1  Jul. 26, 2007

(51) Int. Cl.
 *H04J 1/16* (2006.01)
(52) U.S. Cl.
 USPC ............................................. 370/235
(58) Field of Classification Search
 USPC .......................... 370/232, 233, 235
 See application file for complete search history.

(56) References Cited

U.S. PATENT DOCUMENTS

| | | | | |
|---|---|---|---|---|
| 5,235,595 A | * | 8/1993 | O'Dowd | 370/392 |
| 5,267,232 A | | 11/1993 | Katsube et al. | 370/230 |
| 5,379,297 A | | 1/1995 | Glover | 370/234 |
| 5,436,886 A | | 7/1995 | McGill | 370/219 |
| 5,444,702 A | | 8/1995 | Burnett | 370/254 |
| 5,467,343 A | | 11/1995 | Lee | 370/351 |
| 5,559,611 A | | 9/1996 | Bloomfield | 358/407 |
| 5,633,861 A | * | 5/1997 | Hanson et al. | 370/232 |
| 5,892,924 A | | 4/1999 | Lyon et al. | 395/200.75 |
| 5,909,440 A | | 6/1999 | Ferguson | 370/389 |
| 5,917,821 A | | 6/1999 | Gobuyan | 370/392 |
| 5,933,425 A | | 8/1999 | Iwata | 370/351 |
| 5,953,318 A | | 9/1999 | Nattkemper | 370/236 |
| 5,991,302 A | | 11/1999 | Berl | 370/400 |
| 5,995,503 A | | 11/1999 | Crawley | 370/351 |
| 6,006,264 A | | 12/1999 | Colby | 709/226 |
| 6,018,530 A | | 1/2000 | Chakravorty | 370/471 |
| 6,072,797 A | | 6/2000 | Fletcher | 370/394 |
| 6,078,590 A | | 6/2000 | Farinacci | 370/432 |
| 6,081,522 A | | 6/2000 | Hendel | 370/389 |
| 6,081,524 A | | 6/2000 | Chase | 370/389 |
| 6,084,879 A | | 7/2000 | Berl | 370/389 |
| 6,091,725 A | | 7/2000 | Cheriton | 370/392 |
| 6,111,877 A | | 8/2000 | Wilford | 370/392 |
| 6,122,272 A | | 9/2000 | Tomaszewski | 370/351 |
| 6,147,996 A | | 11/2000 | Laor | 370/394 |
| 6,157,641 A | | 12/2000 | Wilford | 370/389 |
| 6,182,139 B1 | | 1/2001 | Brendel | 709/226 |
| 6,182,147 B1 | | 1/2001 | Farinacci | 709/238 |

(Continued)

OTHER PUBLICATIONS

Search Report and Written Opinion from PCT Application No. PCT/US2007/01516 mailed on Oct. 16, 2007.

(Continued)

*Primary Examiner* — Mark Rinehart
*Assistant Examiner* — Mohammad Anwar
(74) *Attorney, Agent, or Firm* — Zilka-Kotab, PC

(57) ABSTRACT

A system, method and computer program product are provided. In use, a plurality of flows associated with packets destined for an output port is identified. A utilization associated with the output port is further measured. Thus, rates of a plurality of the flows destined for the output port may be individually controlled at an input port thereof, based on the utilization to ensure that the utilization remains less than 99.9% and avoid buffering more than 400 packets with a correspondingly low delay.

17 Claims, 3 Drawing Sheets

(56) References Cited

U.S. PATENT DOCUMENTS

| | | | |
|---|---|---|---|
| 6,185,188 B1 * | 2/2001 | Hasegawa | 370/235 |
| 6,192,051 B1 | 2/2001 | Lipman | 370/389 |
| 6,195,697 B1 | 2/2001 | Bowman-Amuah | 709/224 |
| 6,195,703 B1 | 2/2001 | Blumenau | 709/238 |
| 6,212,182 B1 | 4/2001 | McKeown | 370/390 |
| 6,212,183 B1 | 4/2001 | Wilford | 370/392 |
| 6,219,699 B1 | 4/2001 | McCloghrie | 709/221 |
| 6,226,750 B1 | 5/2001 | Trieger | 713/201 |
| 6,243,667 B1 | 6/2001 | Kerr et al. | 703/27 |
| 6,260,120 B1 | 7/2001 | Blumenau et al. | 711/152 |
| 6,269,099 B1 | 7/2001 | Borella et al. | 370/389 |
| 6,279,035 B1 | 8/2001 | Brown et al. | 709/224 |
| 6,308,219 B1 | 10/2001 | Hughes | 709/238 |
| 6,310,860 B1 | 10/2001 | Sheu et al. | 370/252 |
| RE37,435 E | 11/2001 | Yoshimura et al. | 370/236 |
| 6,330,599 B1 | 12/2001 | Harvey | 709/223 |
| 6,331,978 B1 | 12/2001 | Ravikanth | 370/392 |
| 6,335,927 B1 | 1/2002 | Elliott | 370/352 |
| 6,336,129 B1 | 1/2002 | Ise | 709/201 |
| 6,343,072 B1 | 1/2002 | Bechtolsheim | 370/351 |
| 6,346,874 B1 | 2/2002 | Maeshima | 340/52 |
| 6,353,856 B1 | 3/2002 | Kanemaki | 709/229 |
| 6,356,530 B1 | 3/2002 | Tomaszewski | 370/232 |
| 6,370,121 B1 | 4/2002 | Hausman | 370/256 |
| 6,377,577 B1 | 4/2002 | Bechtolsheim | 370/392 |
| 6,381,244 B1 | 4/2002 | Nishimura | |
| 6,385,642 B1 | 5/2002 | Chlan | 709/203 |
| 6,389,475 B1 | 5/2002 | Speakman | 709/232 |
| 6,389,506 B1 | 5/2002 | Ross | 711/108 |
| 6,412,006 B2 | 6/2002 | Naudus | 709/227 |
| 6,421,711 B1 | 7/2002 | Blumenau | 709/213 |
| 6,424,649 B1 | 7/2002 | Laor | 370/359 |
| 6,424,934 B2 | 7/2002 | Welfeld | 703/25 |
| 6,434,120 B1 | 8/2002 | Natarajan | 370/255 |
| 6,438,595 B1 | 8/2002 | Blumenau | 709/226 |
| 6,446,126 B1 | 9/2002 | Huang | 709/226 |
| 6,456,594 B1 | 9/2002 | Kaplan | 370/238 |
| 6,473,404 B1 | 10/2002 | Kaplan | 370/238 |
| 6,480,888 B1 | 11/2002 | Pedersen | 709/218 |
| 6,496,932 B1 | 12/2002 | Trieger | 713/168 |
| 6,499,061 B1 | 12/2002 | Benayoun et al. | 709/245 |
| 6,504,817 B2 | 1/2003 | Oldfield et al. | 370/217 |
| 6,512,766 B2 | 1/2003 | Wilford | 370/389 |
| 6,515,963 B1 | 2/2003 | Bechtolsheim et al. | 370/229 |
| 6,515,999 B1 | 2/2003 | Nagami et al. | 370/409 |
| 6,563,794 B1 | 5/2003 | Takashima et al. | 370/236 |
| 6,567,405 B1 | 5/2003 | Borella et al. | 370/389 |
| 6,574,195 B2 | 6/2003 | Roberts | 370/235 |
| 6,574,667 B1 | 6/2003 | Blumenau | 709/229 |
| 6,603,772 B1 | 8/2003 | Moussavi | 370/432 |
| 6,611,522 B1 | 8/2003 | Zheng | |
| 6,611,528 B1 | 8/2003 | Farinacci | 370/432 |
| 6,614,795 B1 | 9/2003 | Jimmei | 370/401 |
| 6,615,358 B1 | 9/2003 | Dowd | 726/14 |
| 6,629,125 B2 | 9/2003 | Elzur | 709/200 |
| 6,643,285 B1 | 11/2003 | Vincent | 370/389 |
| 6,647,208 B1 | 11/2003 | Kirby | 398/45 |
| 6,668,297 B1 | 12/2003 | Karr | 710/305 |
| 6,690,654 B2 | 2/2004 | Elliott | 370/260 |
| 6,697,354 B1 | 2/2004 | Borella | 370/352 |
| 6,707,796 B1 | 3/2004 | Li | 370/254 |
| 6,708,219 B1 | 3/2004 | Borella | 709/245 |
| 6,718,387 B1 | 4/2004 | Gupta et al. | 709/226 |
| 6,721,273 B1 * | 4/2004 | Lyon | 370/235 |
| 6,731,625 B1 | 5/2004 | Eastep et al. | 370/352 |
| 6,731,642 B1 | 5/2004 | Borella et al. | 370/401 |
| 6,732,187 B1 | 5/2004 | Lougheed et al. | 709/245 |
| 6,738,387 B1 | 5/2004 | Lin et al. | 370/429 |
| 6,754,181 B1 | 6/2004 | Elliott et al. | 370/252 |
| 6,757,249 B1 * | 6/2004 | Kejriwal et al. | 370/235.1 |
| 6,757,791 B1 | 6/2004 | O'Grady et al. | 711/154 |
| 6,760,331 B1 | 7/2004 | Moussavi et al. | 370/390 |
| 6,763,040 B1 | 7/2004 | Hite et al. | 370/522 |
| 6,765,921 B1 | 7/2004 | Stacey et al. | 370/401 |
| 6,768,743 B1 | 7/2004 | Borella et al. | 370/401 |
| 6,771,642 B1 | 8/2004 | Seaver et al. | 370/360 |
| 6,781,982 B1 | 8/2004 | Borella et al. | 370/352 |
| 6,791,979 B1 | 9/2004 | Berl et al. | 370/389 |
| 6,798,776 B1 | 9/2004 | Cheriton et al. | 370/392 |
| 6,798,788 B1 | 9/2004 | Viswanath et al. | 370/469 |
| 6,799,255 B1 | 9/2004 | Blumenau et al. | 711/152 |
| 6,829,437 B2 | 12/2004 | Kirby | 398/57 |
| 6,831,923 B1 | 12/2004 | Laor et al. | 370/412 |
| 6,853,638 B2 | 2/2005 | Cohen | 370/389 |
| 6,862,284 B1 | 3/2005 | Spiegel et al. | 370/395.1 |
| 6,889,181 B2 | 5/2005 | Kerr | 703/27 |
| 6,914,883 B2 | 7/2005 | Dharanikota | |
| 6,920,112 B1 | 7/2005 | McCloghrie | 370/252 |
| 6,922,410 B1 | 7/2005 | O'Connell | 370/401 |
| 6,922,564 B2 | 7/2005 | Witana | |
| 6,948,074 B1 | 9/2005 | Borella | 713/168 |
| 6,952,415 B2 | 10/2005 | Stern | 370/352 |
| 6,954,431 B2 | 10/2005 | Roberts | 370/235 |
| 6,965,572 B1 | 11/2005 | Boodaghians | 370/249 |
| 6,977,932 B1 | 12/2005 | Hauck | 370/392 |
| 7,440,403 B2 * | 10/2008 | Rosenfled | 370/235 |
| 2001/0030649 A1 | 10/2001 | Mamiya et al. | 345/530 |
| 2002/0075883 A1 | 6/2002 | Dell et al. | 370/413 |
| 2002/0141379 A1 * | 10/2002 | Davari et al. | 370/351 |
| 2003/0058793 A1 * | 3/2003 | Rochon et al. | 370/229 |
| 2003/0112758 A1 * | 6/2003 | Pang et al. | 370/235 |
| 2003/0223442 A1 * | 12/2003 | Huang et al. | 370/412 |
| 2004/0085958 A1 | 5/2004 | Oman | 370/389 |
| 2004/0160954 A1 | 8/2004 | Shimizu et al. | 370/389 |
| 2005/0063307 A1 | 3/2005 | Samuels et al. | 370/235 |
| 2005/0201284 A1 * | 9/2005 | Cheriton | 370/232 |
| 2005/0238022 A1 | 10/2005 | Panigrahy | 370/392 |
| 2006/0020691 A1 * | 1/2006 | Patterson et al. | 709/223 |
| 2006/0165166 A1 * | 7/2006 | Chou et al. | 375/240.05 |

OTHER PUBLICATIONS

International Preliminary Examination Report from PCT Application No. PCT/US2007/01516 mailed on Jul. 31, 2008.
U.S. Appl. No. 11/335,969, filed Jan. 20, 2006.
Office Action Summary from U.S. Appl. No. 11/335,969 which was mailed on Dec. 12, 2008.
Final Office Action Summary from U.S. Appl. No. 11/335,969 mailed on Jun. 11, 2009.
"Bring on the router, I mean switches . . . ", by Network World, Jan. 4, 1999, http://www.networkworld.com/news/power99/bringonrouters.html, pp. 1-2.

* cited by examiner

SYSTEM, METHOD, AND COMPUTER PROGRAM PRODUCT FOR CONTROLLING OUTPUT PORT UTILIZATION

RELATED APPLICATION(S)

The present application is related to a co-pending application filed coincidently herewith with common inventors under the title "SYSTEM, METHOD, AND COMPUTER PROGRAM PRODUCT FOR IP FLOW ROUTING" Ser. No. 11/335,969, which is incorporated herein by reference in its entirety for all purposes.

BACKGROUND AND FIELD OF THE INVENTION

The present invention relates to routers, and more particularly, to routing flows of packets.

SUMMARY

A system, method and computer program product are provided. In use, a plurality of flows associated with packets destined for an output port are identified. A utilization associated with the output port is further measured. Thus, rates of a plurality of the flows destined for the output port may be individually controlled at an input port thereof, based on the utilization to ensure that the utilization remains less than 99.9% and avoid buffering more than 400 packets with a correspondingly low delay.

DETAILED DESCRIPTION

Figure 1:
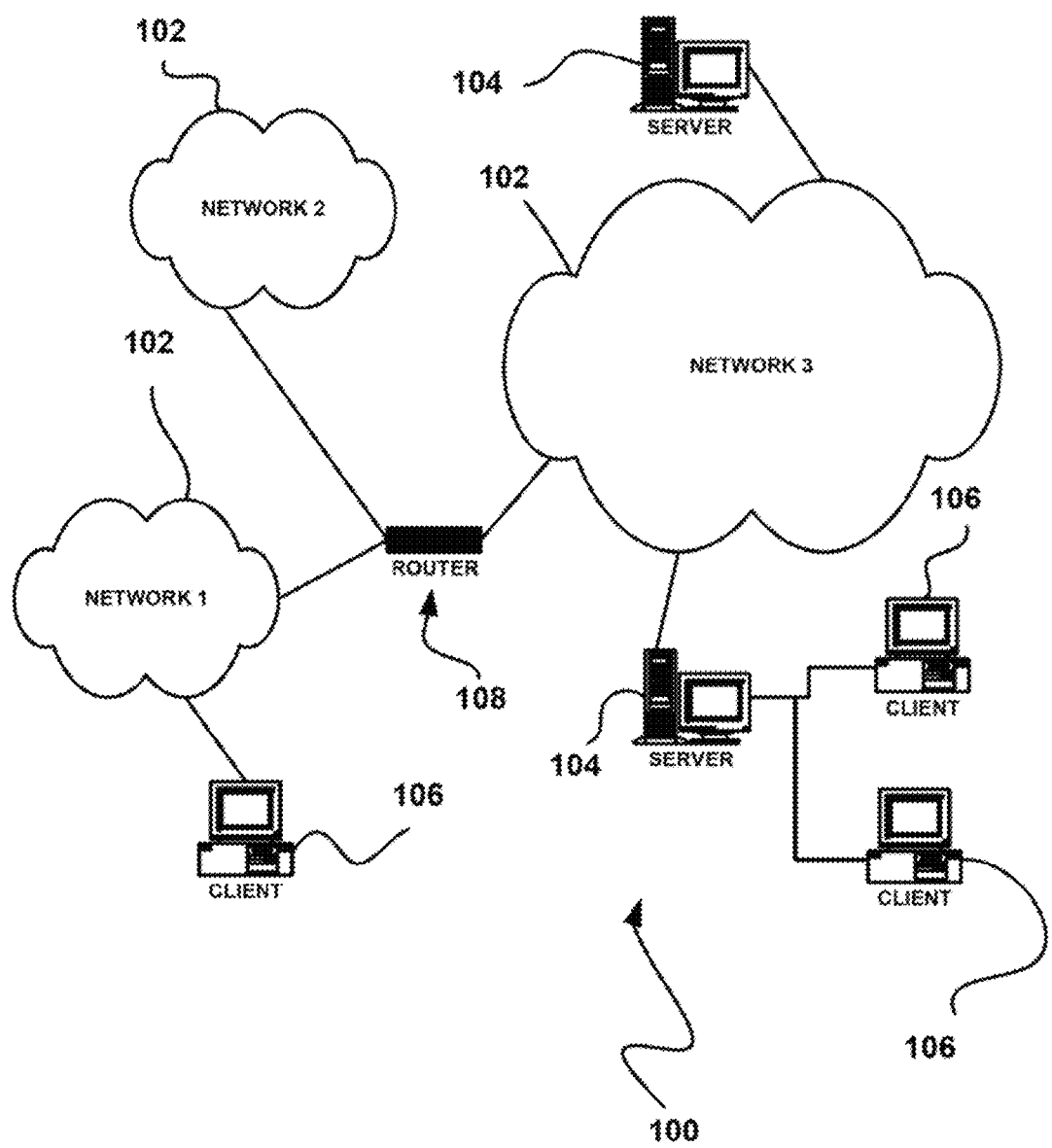
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), wireless network, wide area network (WAN) such as the Internet, etc.

Coupled to the networks 102 are server computers 104 which are capable of communicating over the networks 102. Also coupled to the networks 102 and the server computers 104 is a plurality of client computers 106. Such client computers 106 may each include a desktop computer, lap-top computer, hand-held computer, mobile phone, hand-held computer, personal video recorder (PVR), a digital media [e.g. compact disc (CD), digital video disc (DVD), MP3, etc.] player, printer, and/or any other type of logic.

In order to facilitate communication among the networks 102, at least one router 108 is coupled between the networks 102. In the context of the present description, such router 108 may include any hardware and/or software capable of facilitating the communication of packets from one point in the network architecture 100 to another. More information regarding various features for enhancing such functionality will be set forth hereinafter in greater detail.

Figure 2:
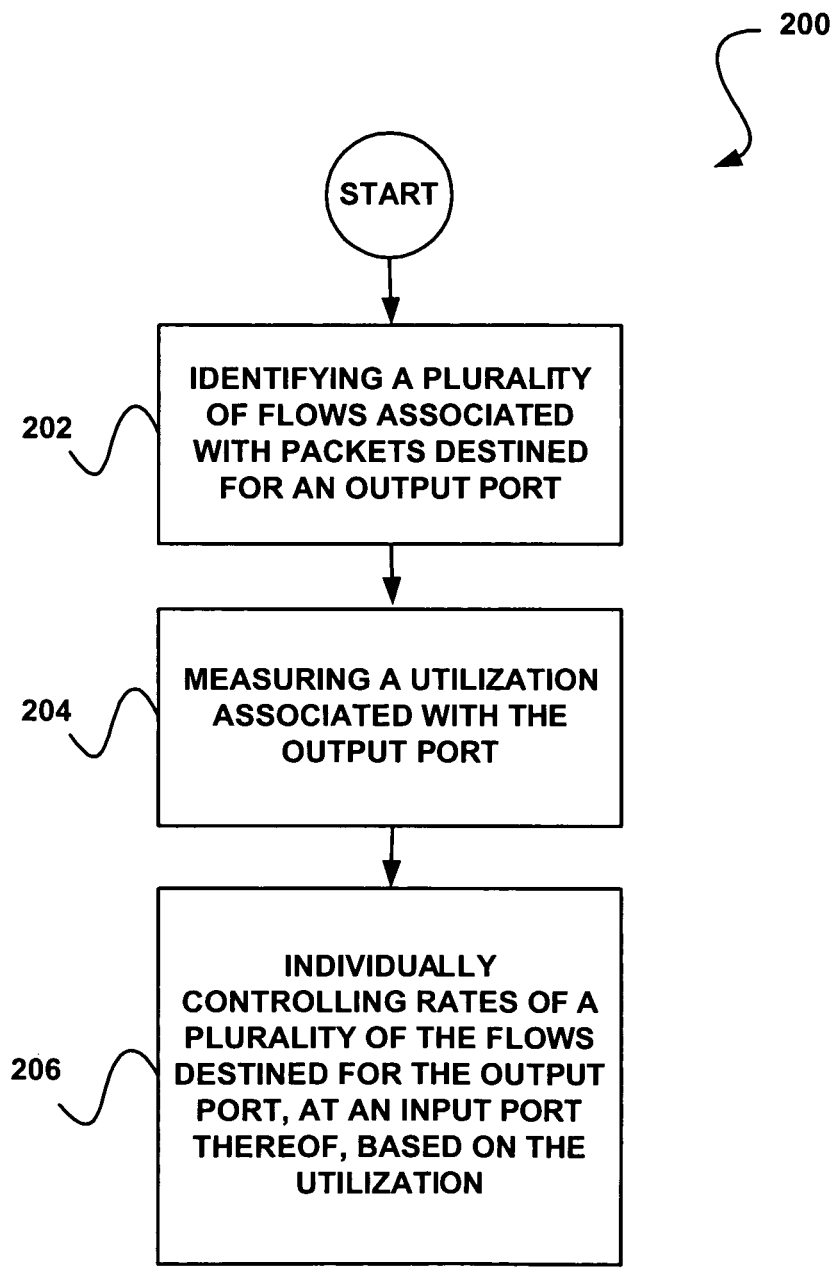
FIG. 2 shows a method for controlling the delay and utilization at an output port, in accordance with one embodiment.

FIG. 2 shows a method 200 for controlling the delay and utilization at an output port, in accordance with one embodiment. As an option, the present method 200 may be implemented in the context of the architecture and environment of FIG. 1. Of course, however, the method 200 may be carried out in any desired environment.

As shown, a plurality of flows associated with packets destined for an output port are identified. Note operation 202. In the context of the present description, such packet may refer to any unit of information capable of being communicated in a computer network (e.g. see, for example, the networks 102 of FIG. 1, etc.). For example, in one illustrative embodiment, the packet may include an Internet Protocol (IP) packet.

Further in the context of the present description, the term flow refers to a collection of packets that relate to a common data transfer. In various optional embodiments, however, the flow may include a bit-stream of some arbitrary length and constitute a single data transfer. In such embodiments, each flow may be broken into packets for the purpose of facilitating delay reduction and error recovery.

Still yet, the output port may refer to any logic output associated with a router (e.g. see, for example, the router 108 of FIG. 1, etc.) and/or component thereof.

As shown in operation 204, a utilization associated with the output port is further measured. In the context of the present description, such utilization may refer to any unit of measurements that reflects an amount of usage of the capacity of the output port that is being utilized. Of course, such measurement may be performed in any desired manner that identifies such utilization.

In various embodiments, the utilization may be measured periodically. For example, the utilization may be measured periodically every millisecond. Of course, it should be noted that the measurement may occur in accordance with any desired timing.

Thus, in operation 206, rates of a plurality of the flows destined for the output port may be individually controlled at an input port thereof, based on the utilization to ensure that the utilization remains less than (and/or possibly equal to) 99.9% and avoid buffering more than 400 packets. In the context of the present description, such rates may each refer to any unit of data, packets, etc. utilizing the output port that is a function of time. Similar to the aforementioned output port, the input port may refer to any logical input associated with a router (e.g. see, for example, the router 108 of FIG. 1, etc.) and/or component thereof.

In one embodiment, the rates may be individually by controlled by rejecting or discarding the new and/or existing flows and/or components thereof. Of course, however, the rates may be controlled in any way that impacts utilization of the output port.

In various embodiments, some or all of the flows destined for the output port may be individually controlled. Further, such control may be independent in nature, such that the rates of the plurality of flows are individually controlled in a different manner. See Table 1 which illustrates an exemplary set of individually controlled flow rates. Further, it should be noted that the rates may be more stringently controlled, so as to ensure that the utilization remains less than 95%, 90%, 80%, or less.

TABLE 1

| | |
|---|---|
| Output port 1 | Flow rate 1 |
| Output port 2 | Flow rate 2 |

TABLE 1-continued

| Output port 3 | Flow rate 3 |
| Output port 4 | Flow rate 4 |

Of course, such table is illustrative in nature and should not be construed as limiting any manner.

Thus, in some embodiments, buffering at the output port may be reduced and/or eliminated, thereby providing a lower delay associated with packet transmission, where such lower delay "corresponds" to (e.g. results from, is a function of, and/or is associated with, etc.) such buffer reduction. For example, as mentioned previously, such buffering may amount to less than 400 packets. In still other embodiments, such buffering may require less than 1 MB of storage capacity and, in some embodiments require 250 KB or less. Even still, the buffering may be further reduced to less than 100 packets in another embodiment, less than 50 packets in another embodiment, less than 20 packets in another embodiment, less than 10 packets in another embodiment, etc.

This may be possibly beneficial particularly when transmitting streaming media (e.g. audio streaming media, video streaming media, etc.). More information regarding such optional feature will be set forth in greater detail during reference to FIG. 3.

In one exemplary embodiment, the rates may be individually controlled utilizing an input flow manager. Further, the measuring may carried out utilizing an output flow manager. Still yet, the utilization may be reported by the output flow manager to a network processing unit (NPU). In such embodiment, such NPU may include one or more processors capable of routing packets. Thus, the input flow manager may be adapted to control the rates based on input from the NPU.

In the context of the present description, the term routing refers to any communication of packets from one point in a network architecture to another, that involves the identification of a destination address by at least being capable of identifying a "longest prefix" match. In various exemplary embodiments that are not to be construed as limiting with respect to the above definition of routing, the aforementioned "longest prefix" match may require only one memory cycle, but may, in other embodiments, require 3-5 memory cycles. Further, the match may, but need not necessarily, be a complete match. Instead, it may involve just enough bytes of the address to determine a desired output port. For example, European communications may be sent to one port so there is no need to keep track of all the Europe addresses, but rather just a first part correlating to Europe, etc.

In other exemplary embodiments that are, again, not to be construed as limiting with respect to the above definition of routing, a second router function may involve determining if traffic to or from certain addresses are to be blocked and/or discarded in relation to a denial of service (DOS) function. Optionally, more than mere addresses may be used to make such decision and an associative memory may be used to accomplish the same. Of course, various other functions may be included, such as a function for prioritizing traffic so that certain types of packets receive a lower delay during the course of traffic shaping, etc.

More illustrative information will now be set forth regarding various optional architectures and features with which the foregoing technique may or may not be implemented, per the desires of the user. It should be strongly noted that the following information is set forth for illustrative purposes and should not be construed as limiting in any manner. Any of the following features may be optionally incorporated with or without the exclusion of other features described.

Figure 3:
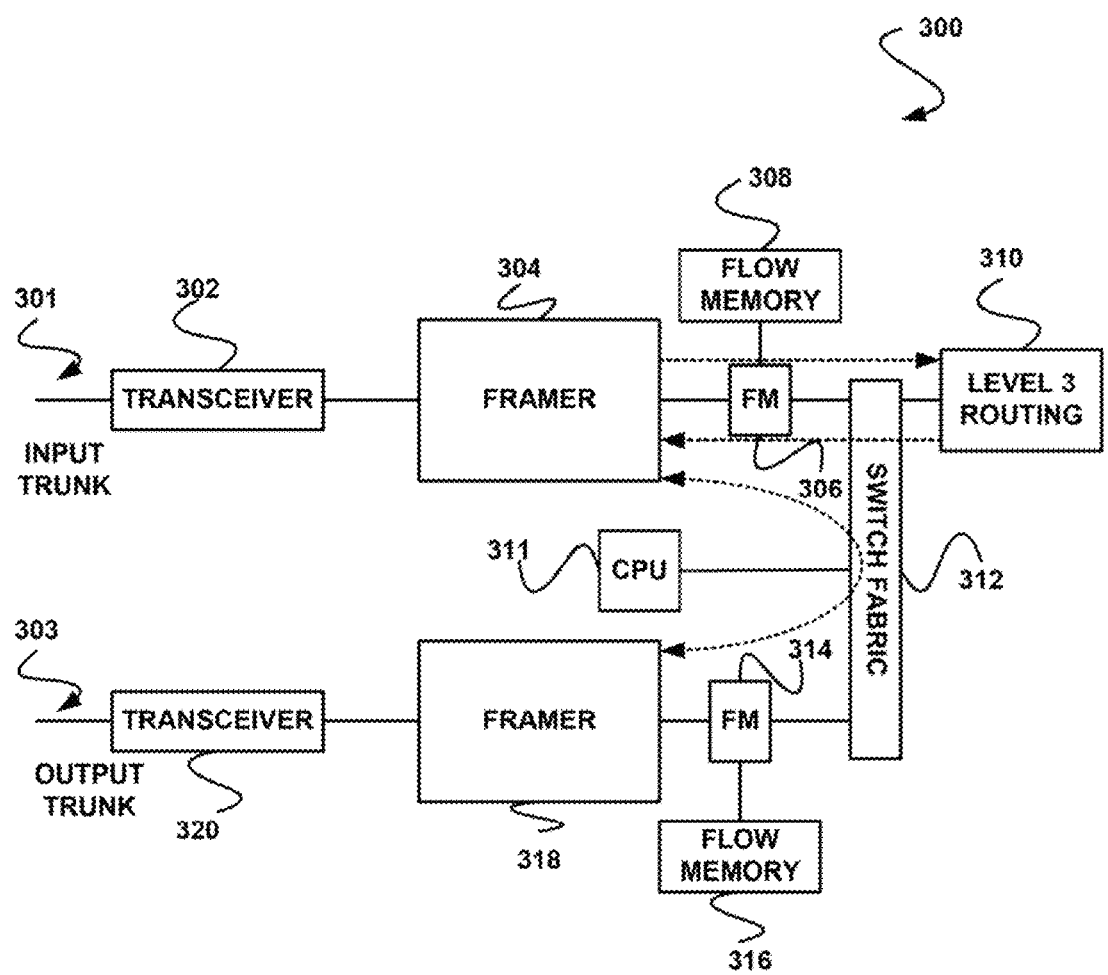
FIG. 3 shows a router system for controlling the delay and utilization at an output port, in accordance with one embodiment.

FIG. 3 shows a router system 300 for controlling a utilization at an output port, in accordance with one embodiment. As an option, the present system 300 may be implemented in the context of the architecture and environment of FIGS. 1-2. Of course, however, the system 300 may be carried out in any desired environment. Further, the foregoing definitions may equally apply in the present description.

As shown, the router system 300 includes an input trunk 301 and an output trunk 303. The input trunk 301 is coupled to an input transceiver 302 for receiving packets via the input trunk 301 and feeding the same to an input framer 304 for performing packet framing. In one embodiment, such packet framing may refer to the method by which packets are sent over a serial line. For example, framing options for T1 serial lines may include D4 and ESF. Further, framing options for E1 serial lines may include CRC4, no-CRC4, multiframe-CRC4, and multiframe-no-CRC4.

Further included is an input flow manager 306 coupled between the input framer 304 and a switching fabric architecture 312. In the present embodiment, the switching fabric architecture 312 may include hardware (e.g. switching integrated circuit, etc.) and/or software that switches incoming packets (e.g. moves incoming packets out via an appropriate output port, etc.) in a manner that will soon become apparent. For controlling such switching fabric architecture 312, a central processing unit 311 may be in communication therewith. Further, the input flow manager 306 may further be coupled to input flow memory 308.

Still yet, an NPU 310 may be in communication with the input flow manager 306 and/or switching fabric architecture 312 for routing incoming packets. Further included is an output flow manager 316 coupled between the switching fabric architecture 312 and an output framer 318. Similar to the input flow manager 306, the output flow manager 316 includes output flow memory 316 for performing similar functions.

Finally, the output framer 318 is coupled to an output transceiver 320 which communicates via the output trunk 303. While the various components are shown to be included in a single package associated with the router system 300, it should be noted that such components may be distributed in any desired manner.

As an option, the input flow manager 306 may function to efficiently control IP flow routing. Specifically, the input flow manager 306 may determine whether a flow associated with a received packet is new. To accomplish this, the input flow manager 306 extracts a header of the packet. In one embodiment, such header may include various fields including, but not limited to a destination address, source address, protocol, destination port, source port, and/or any other desired information.

Next, one or more of the fields are combined in the form of a hash. As an option, such hash may take the form of a 32-bit flow identifier. The input flow manager 306 then uses the hash (e.g. a lower 21 bits of the 32-bit flow identifier, etc.), and does a memory look up in a hash table stored in the input flow memory 308. Specifically, in one exemplary embodiment, a binary tree is followed using a remaining 11 bits of the 32-bit flow identifier until a pointer to a flow record is located in the input flow memory 308 that makes an exact match with the destination address, source address, protocol, destination port, and source port, etc. Such record (if it exists) constitutes a flow record for the identified flow.

If it is determined that the flow associated with the packet is new, at least a portion of the packet may be routed utilizing the NPU 310. If, on the other hand, it is determined that the flow associated with the packet is not new, at least a portion of the packet may be routed or switched utilizing the switching fabric architecture 312, which may cost at least 10 times less than the first module. More information regarding such functionality may be found in a co-pending application filed coincidently herewith with common inventors under the title "SYSTEM, METHOD, AND COMPUTER PROGRAM PRODUCT FOR IP FLOW ROUTING", which is incorporated herein by reference in its entirety for all purposes.

Further during operation, the output flow manager 316 is equipped with output flow management functionality. Specifically, the output flow manager 316 may operate in conjunction with the remaining components shown in FIG. 3 to carry out the functionality associated with the method 300 of FIG. 3.

In one exemplary implementation of the method 300 of FIG. 3, a queuing buffer size and packet delay associated with an output port may be controlled. In particular, the output frame manager 316 measures an output utilization on each of a plurality of output ports. Such output port-specific utilization may then be reported by the output frame manager 316 to the NPU 310 periodically (e.g. every millisecond, etc.).

When a new flow is identified in the manner described above, it is assigned to a particular output port. At this time, by virtue of the foregoing measurement, the utilization of such output port is known. With this knowledge, a rate may be determined for the flow that will not overload the output port beyond 99.9%.

It should be noted that there are two basic types of flows, namely those that a network controls the rate (e.g. TCP, typical file transfers, etc.), and those where a sender controls the rate (e.g. UDP, typical voice and video streaming media, etc.). For those flows that the network controls, a rate may be set that will not overload the output port.

On the other hand, for flows that the user controls the rate, lost packets may be harmful. Thus, it may be beneficial to reject new flows, if they would overload the output port. This may be done when a first packet of a flow is identified. If it is discarded, no flow record need necessarily be made, and no further packets need necessarily be accepted for that flow until there is sufficient capacity.

Thus, the input frame manager 308 may be informed by the NPU 310 of the rate and/or whether to accept the new flow. The input frame manager 308 may then manage the rates by rejecting and/or discarding new flows to ensure that a sum of the rates associated with each output port is kept under a predetermined utilization (e.g. 95%, etc.). Given this technique, a queue at the output trunk 303 may be designed to be small (e.g. 100 packets or less, etc.) and an associated delay low (e.g. 100 microseconds or less, 100 packets of 1200 bytes at 10 Gbps, etc.).

Thus, a significant improvement in both buffer expense and packet delay may optionally be achieved with the present approach. These results are facilitated by separating the foregoing functionality associated with the input frame manager 308 with respect to the NPU 310, so that flows to the NPU 310 may be governed in the foregoing manner.

While various embodiments have been described above, it should be understood that they have been presented by way of example only, and not limitation. For example, any of the network elements may employ any of the desired functionality set forth hereinabove. Thus, the breadth and scope of a preferred embodiment should not be limited by any of the above-described exemplary embodiments, but should be defined only in accordance with the following claims and their equivalents.

What is claimed is:

1. A method, comprising:
identifying a plurality of flows associated with internet protocol packets destined for an output port, each of the flows including a collection of packets with a common destination address, source address, protocol, destination port, and source port;
measuring a utilization associated with the output port utilizing an output flow manager;
forwarding, from the output flow manager, the measured utilization to a network processing unit (NPU) including at least one processor for use in routing the packets to the common destination address;
receiving the measured utilization from the NPU at an input flow manager; and
individually controlling rates of each of the flows destined for the output port, at an input port thereof and utilizing the input flow manager, based on the utilization to ensure that the utilization remains less than 99.9%, ensure packet loss is not harmful, and avoid buffering more than 400 packets with a correspondingly low delay;
wherein individually controlling the rates includes controlling a rate of each individual flow by only dropping a single packet from the individual flow such that the rate of the individual flow is forced to slow down by a Transmission Control Protocol (TCP) process utilized at a sending computer including the output port;
wherein a decision process used to determine if the individual flow is be slowed down by dropping the single packet predicts a composite output rate for each output port in advance of any output port overload such that the TCP process has sufficient time to reduce the rate to hold the utilization below 99.9%;
wherein the identifying, the measuring and the controlling are performed by hardware or software facilitating the communication of packets from one point in a network to another point in the network.

2. The method of claim 1, wherein the rates of the plurality of flows destined for the output port are each individually controlled in a different manner, at the input port thereof.

3. The method of claim 1, wherein the rates of the plurality of flows destined for the output port are individually controlled, at the input port thereof, based on the utilization to ensure that the utilization remains less than 95%.

4. The method of claim 1, wherein the rates of the plurality of flows destined for the output port are individually controlled, at the input port thereof, based on the utilization to avoid use of more than 1 MB of buffer capacity.

5. The method of claim 1, wherein the rates of the plurality of flows destined for the output port are individually controlled, at the input port thereof, based on the utilization to avoid use of more than 100 KB of buffer capacity.

6. The method of claim 1, wherein the packets together comprise streaming media.

7. The method of claim 6, wherein the streaming media includes audio streaming media.

8. The method of claim 6, wherein the streaming media includes video streaming media.

9. The method of claim 1, wherein the utilization is measured periodically.

10. The method of claim 9, wherein the utilization is measured periodically every 50 milliseconds.

11. The method of claim 1, wherein the controlling includes rejecting a new flow.

12. The method of claim 1, wherein the controlling includes discarding a new flow.

13. The method of claim 1, wherein the identifying, the measuring and the controlling are performed by a router.

14. The method of claim 1, wherein the rates of the plurality of flows destined for the output port are individually controlled, at the input port thereof, based on the utilization to ensure that the utilization remains less than 90%.

15. The method of claim 1, wherein the rates of the plurality of flows destined for the output port are individually controlled, at the input port thereof, based on the utilization to ensure that the utilization remains less than 80%.

16. A computer program product embodied on a non-transitory computer readable medium, comprising:
  computer code for identifying a plurality of flows associated with internet protocol packets destined for an output port, each of the flows including a collection of packets with a common destination address, source address, protocol, destination port, and source port;
  computer code for measuring a utilization associated with the output port utilizing an output flow manager;
  computer code for forwarding, from the output flow manager, the measured utilization to a network processing unit (NPU) including at least one processor for use in routing the packets to the common destination address;
  computer code for receiving the measured utilization from the NPU at an input flow manager; and
  computer code for individually controlling rates of each of the flows destined for the output port, at an input port thereof and utilizing the input flow manager, based on the utilization to ensure that the utilization remains less than or equal to 99.9%, ensure packet loss is not harmful, and avoid buffering more than 400 packets with a correspondingly low delay;
  wherein the computer program product is operable such that individually controlling the rates includes controlling a rate of each individual flow by only dropping a single packet from the individual flow such that the rate of the individual flow is forced to slow down by a Transmission Control Protocol (TCP) process utilized at a sending computer including the output port;
  wherein the computer program product is operable such that a decision process used to determine if the individual flow is be slowed down by dropping the single packet predicts a composite output rate for each output port in advance of any output port overload such that the TCP process has sufficient time to reduce the rate to hold the utilization below 99.9%;
  wherein the identifying, the measuring and the controlling are performed by hardware or software facilitating the communication of packets from one point in a network to another point in the network.

17. A system, comprising:
  an input flow manager for identifying a plurality of flows associated with internet protocol packets destined for an output port, each of the flows including a collection of packets with a common destination address, source address, protocol, destination port, and source port; and
  an output flow manager for measuring a utilization associated with the output port, forwarding the measured utilization to a network processing unit (NPU) including at least one processor for use in routing the packets to the common destination address;
  wherein the input flow manager receives the measured utilization from the NPU;
  wherein the input flow manager individually controls rates of each of the flows destined for the output port, at an input port thereof, based on the utilization to ensure that the utilization remains less than 99.9%, ensure packet loss is not harmful, and avoid buffering more than 400 packets with a correspondingly low delay;
  wherein the input flow manager is operable such that individually controlling the rates includes controlling a rate of each individual flow by only dropping a single packet from the individual flow such that the rate of the individual flow is forced to slow down by a Transmission Control Protocol (TCP) process utilized at a sending computer including the output port;
  wherein the input flow manager is operable such that a decision process used to determine if the individual flow is be slowed down by dropping the single packet predicts a composite output rate for each output port in advance of any output port overload such that the TCP process has sufficient time to reduce the rate to hold the utilization below 99.9%;
  wherein the identifying, the measuring and the controlling are performed by hardware or software facilitating the communication of packets from one point in a network to another point in the network.

* * * * *